(12) United States Patent
Lee

(10) Patent No.: US 7,586,415 B2
(45) Date of Patent: Sep. 8, 2009

(54) RFID TAG AND CERAMIC PATCH ANTENNA

(75) Inventor: Dong-Jin Lee, Gwangyang-Si (KR)

(73) Assignee: Sontec Co., Ltd., Gwangyang-Si, Jeollanam-do (KR)

( * ) Notice: Subject to any disclaimer, the term of this patent is extended or adjusted under 35 U.S.C. 154(b) by 258 days.

(21) Appl. No.: 11/553,329

(22) Filed: Oct. 26, 2006

(65) Prior Publication Data
US 2007/0200706 A1     Aug. 30, 2007

(30) Foreign Application Priority Data
Feb. 28, 2006    (KR) ..................... 10-2006-0019547

(51) Int. Cl.
     *G08B 13/14* (2006.01)
(52) U.S. Cl. .................................................. 340/572.7
(58) Field of Classification Search ... 340/572.1–572.9, 340/10.1; 235/439, 492
See application file for complete search history.

(56) References Cited

U.S. PATENT DOCUMENTS

| | | | |
|---|---|---|---|
| 5,448,250 A * | 9/1995 | Day | 343/700 MS |
| 2004/0052034 A1 * | 3/2004 | Senba et al. | 361/600 |
| 2006/0044190 A1 | 3/2006 | Park et al. | |

* cited by examiner

*Primary Examiner*—Phung Nguyen
(74) *Attorney, Agent, or Firm*—Jones Day

(57) ABSTRACT

A radio frequency identification (RFID) tag is provided including a lower antenna, an upper antenna, a RFID chip, and a spacer. The lower antenna has a coupling projection at one end. The upper antenna has a coupling groove at one end. The RFID chip contains information of an object which can be communicated with a reader device. One end of the RFID chip is coupled with the projection of the lower antenna and the other end is coupled with the groove of the upper antenna. The spacer is between the antennas to isolate the antennas electrically. The antennas are combined on both sides of the spacer in parallel. The RFID chip is connected with the antennas and fitted on a top side or a bottom side of the spacer so that active signals are transmitted through the antennas to send the information in the RFID chip to the reader device.

24 Claims, 11 Drawing Sheets

RFID TAG AND CERAMIC PATCH ANTENNA

CROSS-REFERENCE TO RELATED APPLICATIONS

This application claims priority to Republic of Korea Application Ser. No. 10-2006-0019547 filed on Feb. 28, 2006, the contents of which is hereby incorporated by reference herein in its entirety.

BACKGROUND OF THE INVENTION

1. Field of the Invention

This invention relates to a RFID Tag and Ceramic Patch Antenna. More specifically, this invention relates to the RFID tags which can be manufactured with easily formable antenna at acceptable cost, while maintaining successful receiving rate, by forming the antenna conjoining at both ends of the RFID chip by printing, spraying, or painting with conductive ink.

Furthermore, by forming dielectric members using ceramic substances of which permittivity is 4.0~210, the size of the dielectric members can be greatly reduced which results in compact and light antenna members so that they can be affixed to moving bodies or small objects. The ceramic patch antenna in accordance with this invention also can improve antenna efficiency as well as convenience in use.

2. Background of the Related Art

The electronic devices to which power is supplied wirelessly through radio frequency and relevant systems are already disclosed. Such communication devices which receive power wirelessly are generally known as Radio Frequency Identification (RFID) Tags. Conventional RFID tags and relevant systems generally make use of electromagnetic couplings which supply power remotely, and the remote devices are connected with the exciter systems and receiver systems. The exciter systems generate the exciter signal which is used to power-up the device so that the device can transmit signals which include relevant data, which is in turn received by the receiver system.

When electromagnetic coupling between remote devices and the exciter, or remote device and the receiver is used, the challenge is in the complexity in relation with the manufacturing of the remote device which utilizes coil antenna. The spiral layout of conventional coil antennas makes it difficult to manufacture, increasing cost and the dimensions of such remote devices. Coil antennas demand strict tolerance for effective performance. In addition, conventional antennas have undesirable thermal compressive characteristics which affect forming of the flat tag which incorporate coil and the remote devices.

SUMMARY OF THE INVENTION

RFID tags and related systems have a wide range of application. For example, they can be used in automated gate access control applications to protect security areas from unauthorized access. In such cases, tags are often manufactured in the form of access control card. The information embedded in the RFID tags enables identification and authentication of persons who approach the secured area. The legacy gate control applications require persons who access building to provide authentication information from their identification tags to the reader, whether by inserting or typing. New RFID tag systems have eliminated the necessity of manually entering authentication data by providing such data through automated wireless transmission technology. More specifically, a user simply holds or locates RFID tags near the base station which is in connection with the security system. The base station transmits exciter signal to power up and activate the RFID tag circuit, so that the tag circuit can send back its information which is received and decoded by the base station to determine authentication. In addition, RFID tags can be written with properly excited and modulated signals remotely.

In addition to the common applications of personal access control, RFID tags can be used for electronic identification of animals, baggage or post tracking, inventory management application, assets identification and tracking, and many other applications involving identification process. These applications relate to the transmission of information from RFID tags to the exciter/reader system. In addition, such applications may relate to sending and writing information to RFID tags. The RFID) tags used in those said applications may be endurable for long-term use or may be disposed of after short-term use. Presently, bar code systems are widely used for the purpose of identifying person or things. Bar code systems are less costly. The major problem in the bar code system is that bar code printing has to be properly aligned with the reader. One another important problem is that printed bar code can be damaged to be unreadable by exposure to moisture or abrasion. RFID tags can solve such problems.

In addition to the necessity of transmitting stored information via radio frequency, RFID tags are often desired to keep printed information, logo, picture, or other type of graphic data which are recognizable by human. In many applications, printed signs require specific customized order which needs printing capability, or they have to be entered into RFID tags directly. These requirements demand RFID tags to be very thin, flat, and adaptable so that they are compatible with present printing techniques including die-sublimation printing, ink jet printing, or flexographic printing. Conventional RFID tags which incorporate coils are subject to limitation in their being thin, flat, and adaptable, not mentioning relevant cost. Especially, printing near the coil antenna is restricted. Therefore, thin and flat RFID tags are required.

The antennas in conventional RFID tags have been formed, in order to reduce their thickness as much as possible, by fixing spirally wound insulated conductor on main substrates, or by removing unnecessary portion of copper or aluminum conductor layer on substrates by etching or punching process.

However, most of the conventional antennas formed at both ends of the RFID tags have been formed with very thin conductive metals, for example, thin copper plate. The antennas formed by affixing, etching, or punching as described hereinabove have limit in their thinness, and their desirable shapes which are required to implement diverse and optimal performance in data transmission and receiving were difficult or complex to attain. To manufacture very thin RFID tag antennas with desired shape, the process and cost were complex and high.

In an exemplary embodiment of the present invention, a radio frequency identification (RFID) tag is provided including a lower antenna, an upper antenna, a RFID chip, and a spacer. The lower antenna has a coupling projection at one end. The upper antenna has a coupling groove at one end. The RFID chip contains information of an object which can be communicated with a reader device. One end of the RFID chip is coupled with the projection of the lower antenna and the other end is coupled with the groove of the upper antenna. The spacer is between the antennas to isolate the antennas electrically. The antennas are combined on both sides of the spacer in parallel. The RFID chip is connected with the antennas and fitted on a top side or a bottom side of the spacer so that active signals are transmitted through the antennas to send the information in the RFID chip to the reader device.

In one embodiment, the antennas are made of copper (Cu). In another embodiment, the antennas are made of gold (Au). In yet another embodiment, the antennas are made of silver (Ag).

In one embodiment, the spacer has a thickness of between approximately 0.1-10 mm.

In one embodiment, the spacer is made of a sponge material. In another embodiment, the spacer is made of ceramics. In yet another embodiment, the spacer is made of Teflon.

In one embodiment, the spacer has a chip mounting groove.

In one embodiment, an exterior of the RFID tag has an additional insulation cover.

In one embodiment, an adhesive layer, having surfaces coated with an adhesive agent, is between the antennas and the spacer.

In one embodiment, exterior sides of the antennas are coated with an adhesive sheet.

In one embodiment, the RFID tag is enclosed in a hexahedron case with an open top side.

In one embodiment, conductive ink is sprayed on the adhesive sheet. In another embodiment, conductive ink is painted on the adhesive sheet. In yet another embodiment, one side of the adhesive sheet is soaked in conductive ink.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
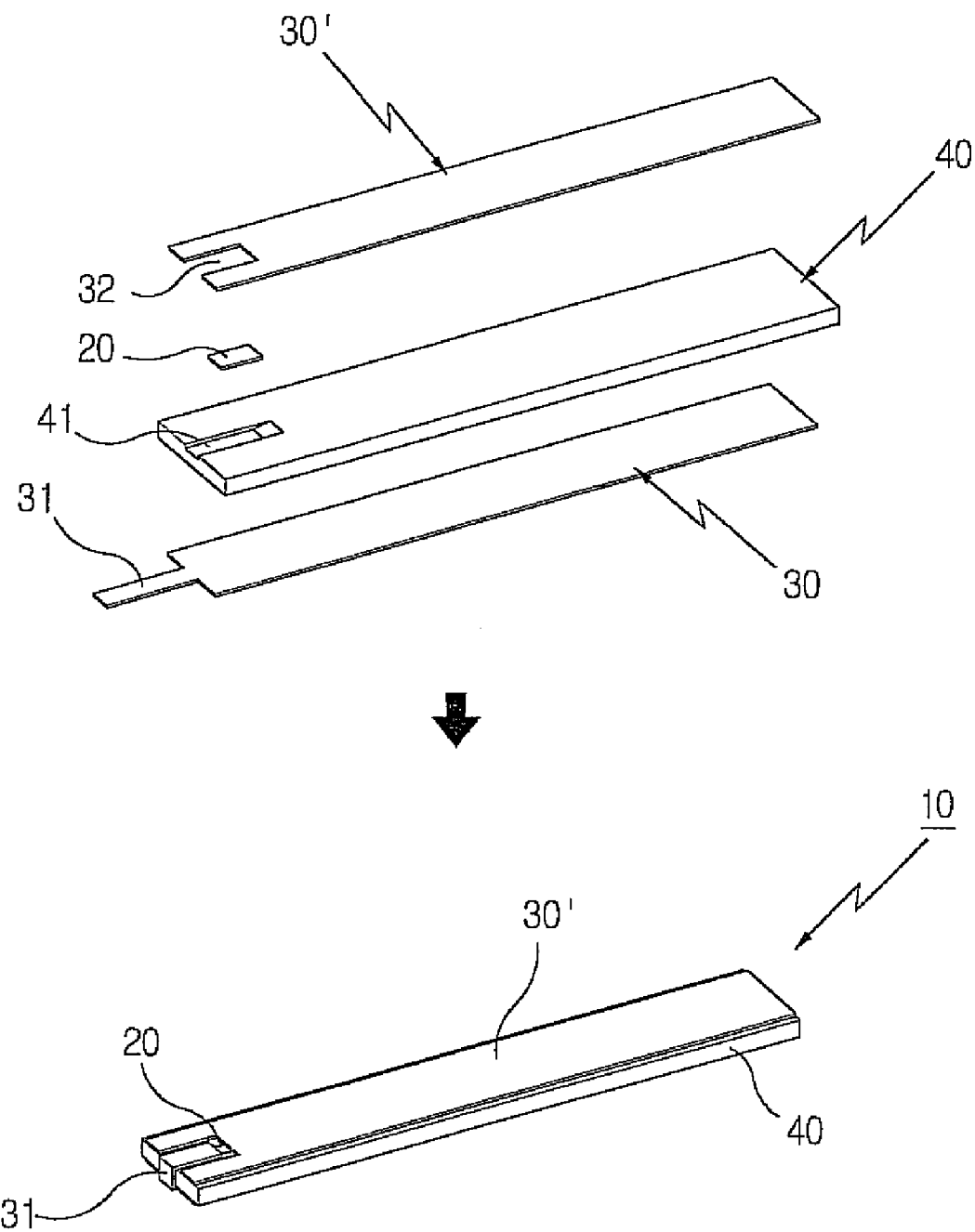
FIG. 1 is a perspective view of the radio frequency identification tag in accordance with this invention.

The present invention relates to a design and method which can solve abovementioned problems. This invention is aiming at manufacturing antennas with very thin metal plate, in their diverse shapes and configurations, enabling acceptable receiving rate, manufacturing cost reduction, and simple process.

According to this invention, the antennas connecting both ends of the RFID chips can be formed by painting, spraying, or printing with conductive ink, enabling easy forming in diverse shapes, very thin, reducing manufacturing facilities and relevant cost, while maintaining their performance.

Furthermore, by forming dielectric member using ceramic substance of which permittivity is 4.0~210, dimensions of the dielectrics can be significantly downsized, enabling compact and light antenna. Therefore, RFID chips produced in accordance with this invention can be affixed to moving or small objects. The ceramic patch antennas produced in accordance with this invention have higher antenna efficiency and enable convenient and wider range of use.

In addition, multiple component antennas can be formed in RFID chip improving directionality and efficiency. Therefore, the antennas produced in accordance with this invention are especially useful for the RFID-based systems.

This invention intends to provide RFID system antennas which function as a part of the long distance reading antenna system within the relevant laws and regulations related with electromagnetic field emission, provide appropriate identification capability for all available tag/antenna directions, provide longer read/write range than the antennas manufactured by conventional art, enable RFID systems to read information in the RFID tags in wider range and width.

In order to achieve abovementioned goals, the present invention provides a RFID tag comprising; lower antenna member of which one end is formed with coupling projection; upper antenna member of which one end is formed with coupling groove; RFID chip of which one end is conjoined with the coupling projection of the lower antenna, the other end is conjoined with the coupling groove of the upper antenna, containing the information of the objective matter and communicating with the relevant terminal device; and electrically isolating spacer which is placed between the two antennas; and the RFID chip connected with the antennas is placed on the upside or downside of the spacer.

And this invention also provides a ceramic patch antenna comprising: a dielectric ceramic of which permittivity range is 4.0~210, having a feeder hole formed at its center; conductive film formed at one side of the dielectric ceramic; earth plate formed at the other side of the dielectric ceramic, having a feeder hole at its center; a feeder pin which is inserted into the feeder hole of the dielectric ceramic, contacting with and feeding electricity to the conductive film. The feeder pin is inserted through the feeder hole of the dielectric ceramic, and the conductive film is constructed to cover the feeder hole formed in the dielectric ceramic and electrically connected with the feeder pin.

A preferred embodiment according to the present invention will now be explained with reference to the accompanying drawings.

Figure 2:
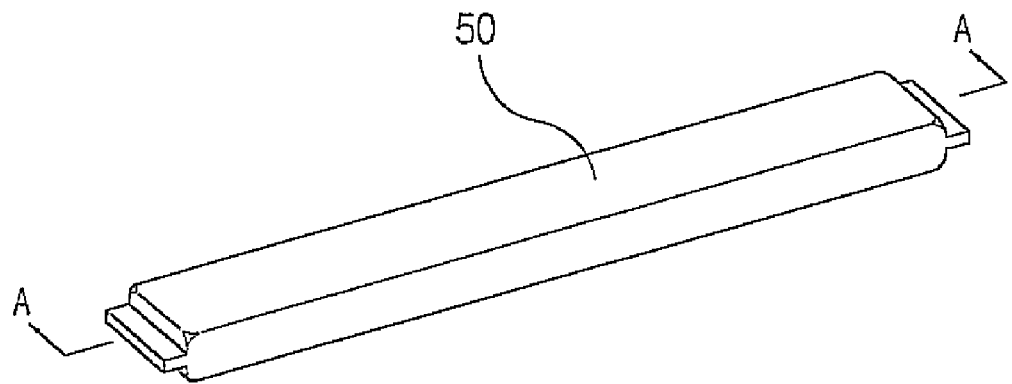
FIG. 2 is a perspective view of the radio frequency identification tag covered with clothing material in accordance with this invention.
Figure 3:
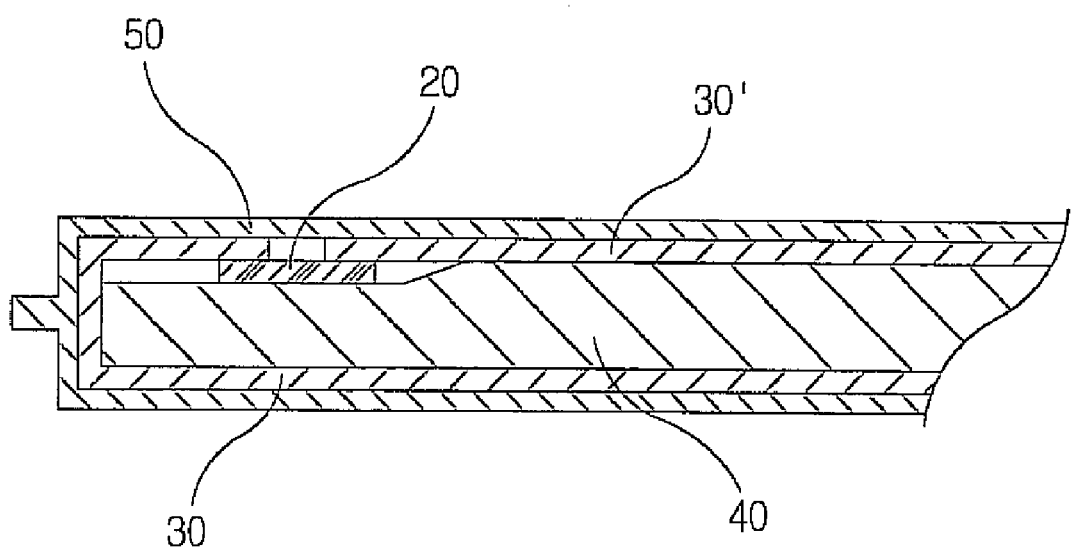
FIG. 3 shows a cross-sectional view taken along the line A-A in FIG. 2.
Figure 4:
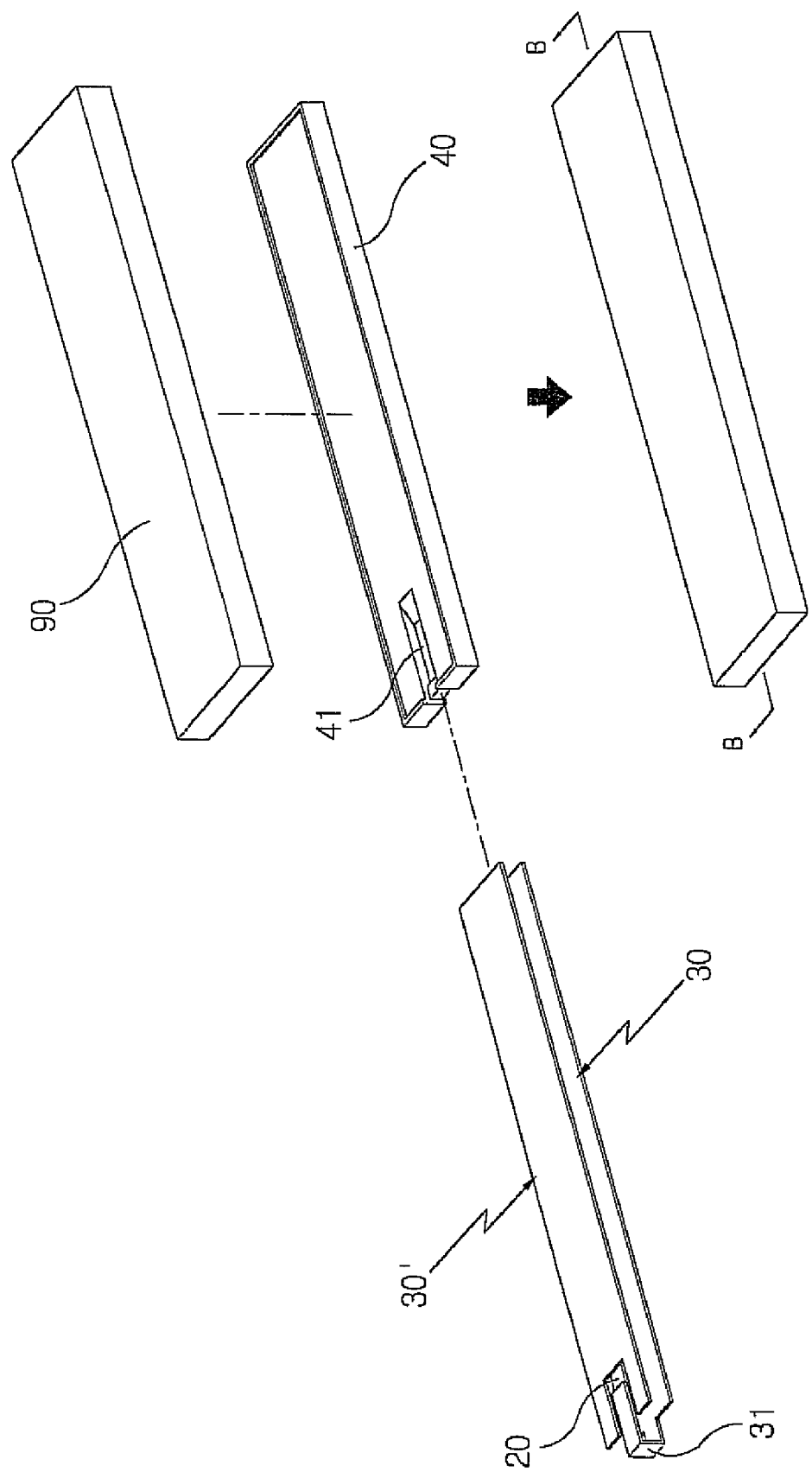
FIG. 4 is an exploded perspective view showing the cased radio frequency identification tag in accordance with this invention.
Figure 5:
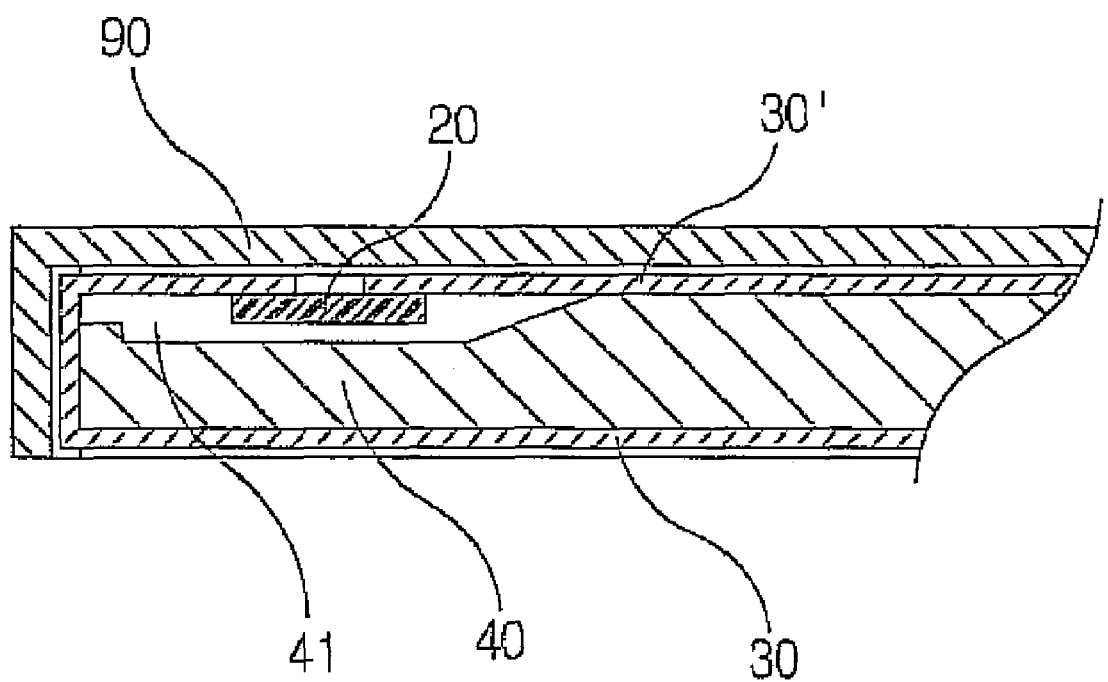
FIG. 5 is a cross-sectional view taken along the line B-B of FIG. 4.
Figure 6:
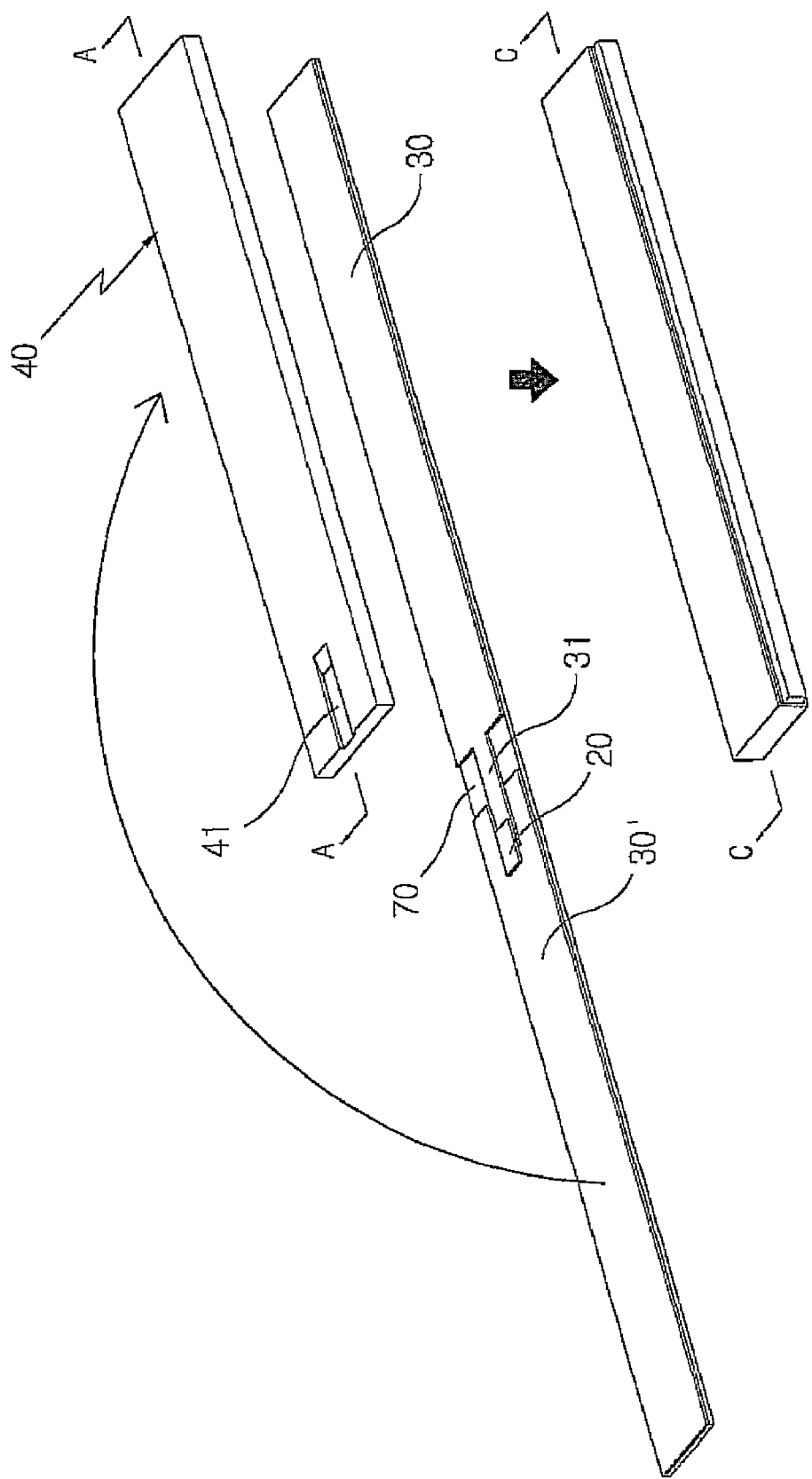
FIG. 6 is a perspective view showing the radio frequency identification tag affixed with the adhesive sheet in accordance with this invention.
Figure 7:
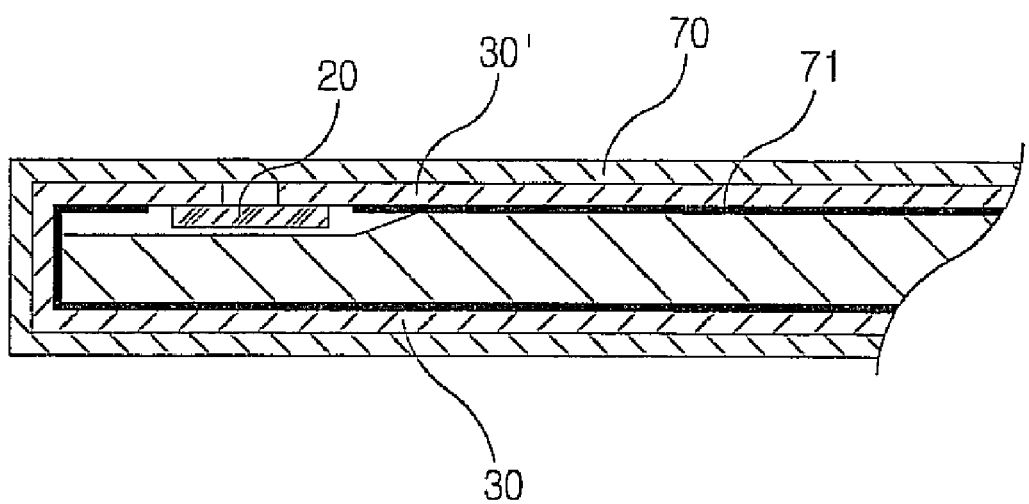
FIG. 7 is a cross-sectional view taken along the line C-C of FIG. 6.
Figure 8:
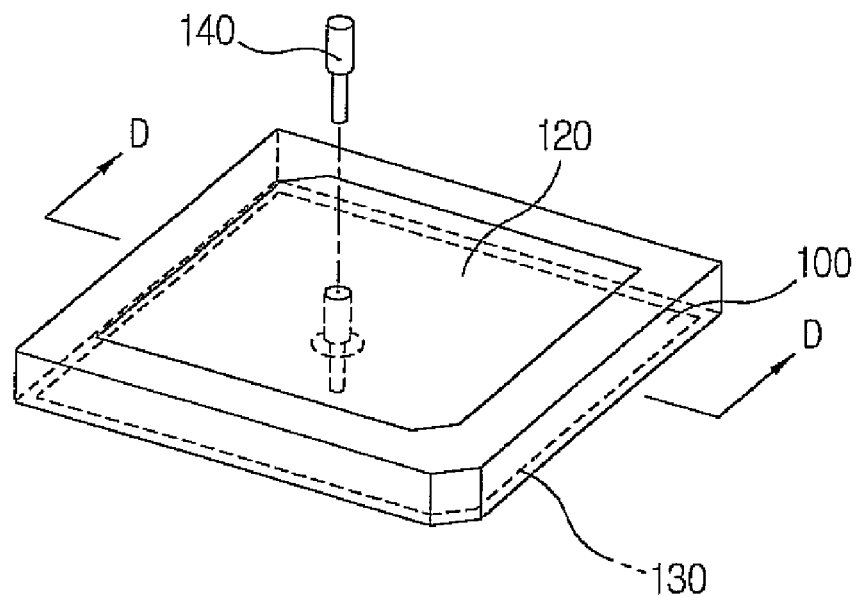
FIG. 8 is a perspective view showing the ceramic patch antenna in accordance with this invention.
Figure 9:
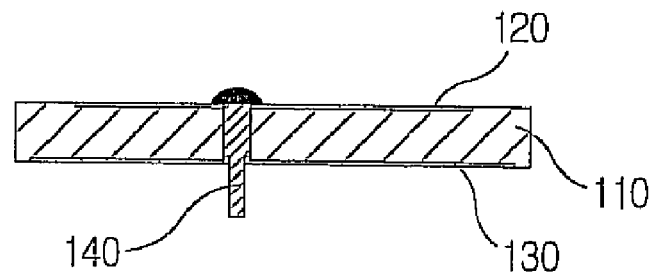
FIG. 9 is a cross-sectional view taken along the line D-D of FIG. 8.
Figure 10:
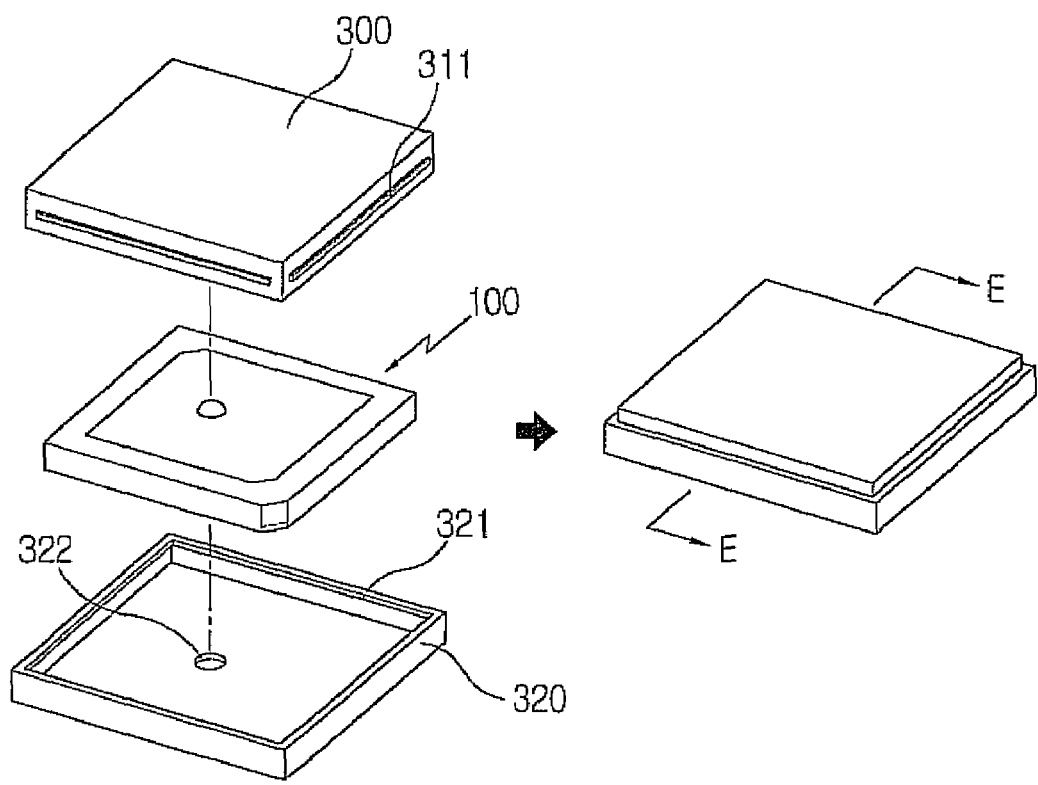
FIG. 10 is an exploded perspective view showing the cased ceramic patch antenna in accordance with this invention.
Figure 11:
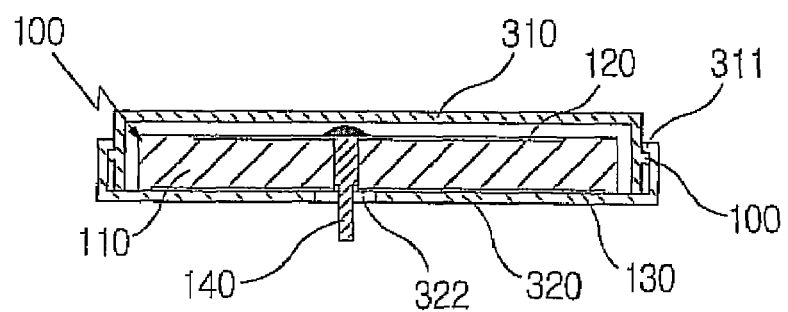
FIG. 11 is a cross-sectional view taken along the line E-E of FIG. 10.
Figure 12:
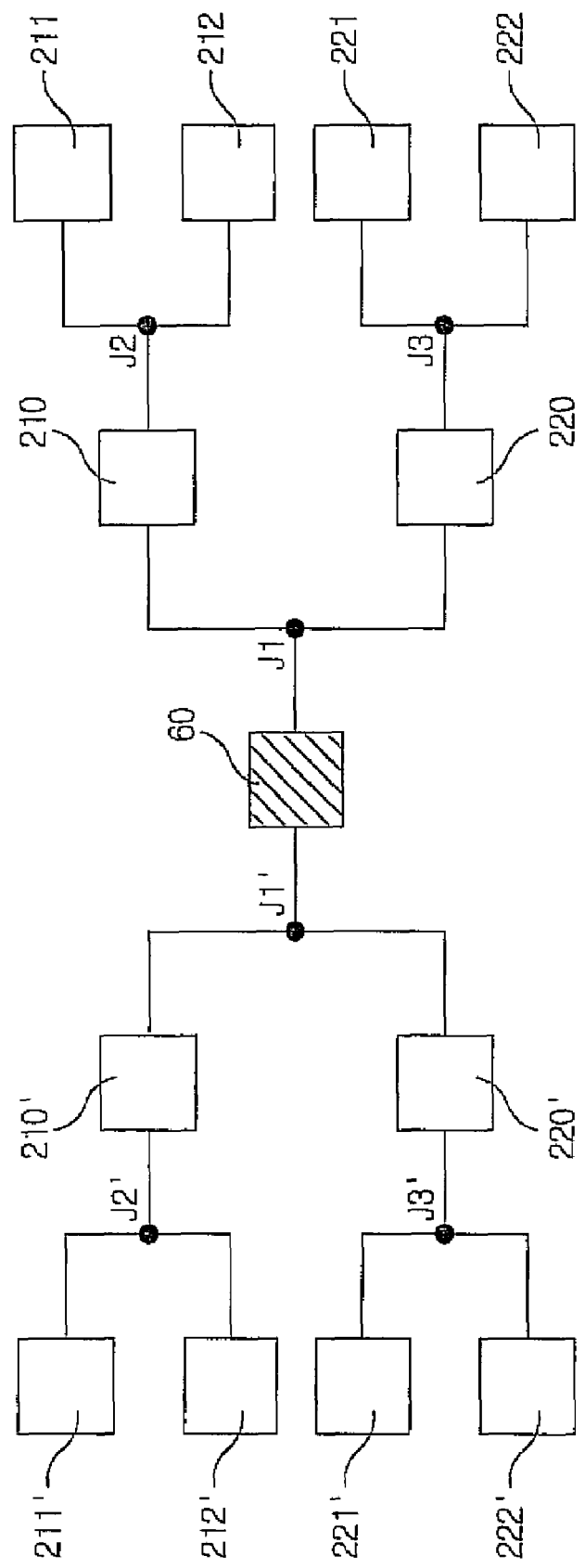
FIG. 12 illustrates an exemplary embodiment of the antenna in accordance with this invention.
Figure 13:
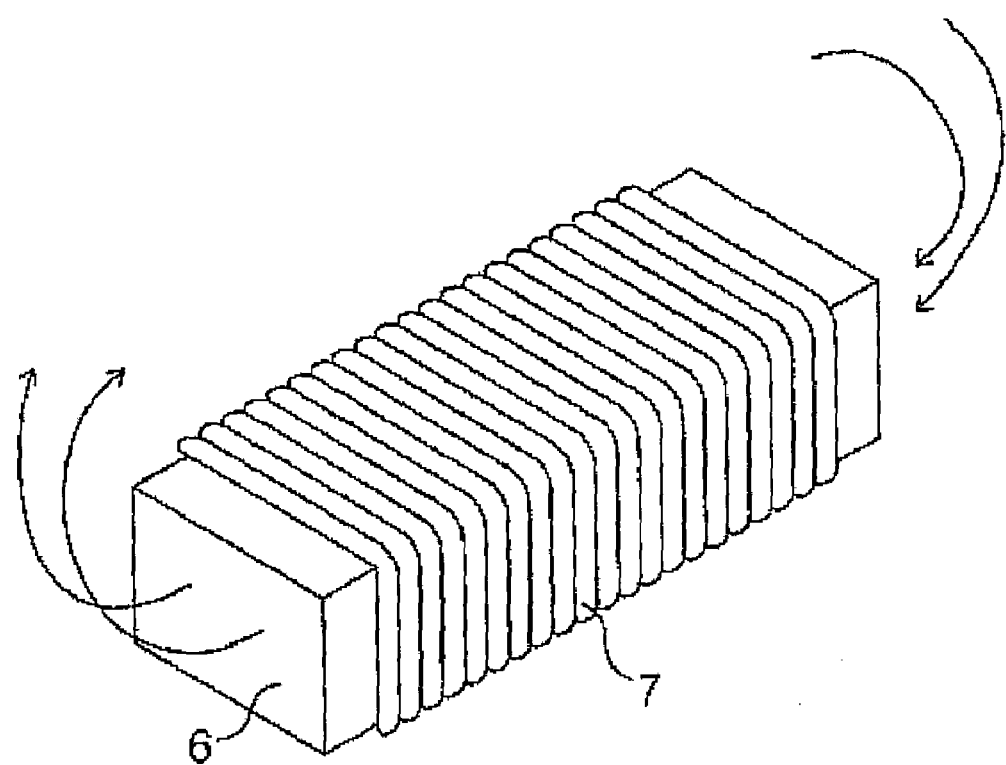
FIG. 13 is a perspective view showing conventional antenna coil which has a conductor wound in spiral around a magnetic member.
Figure 14:
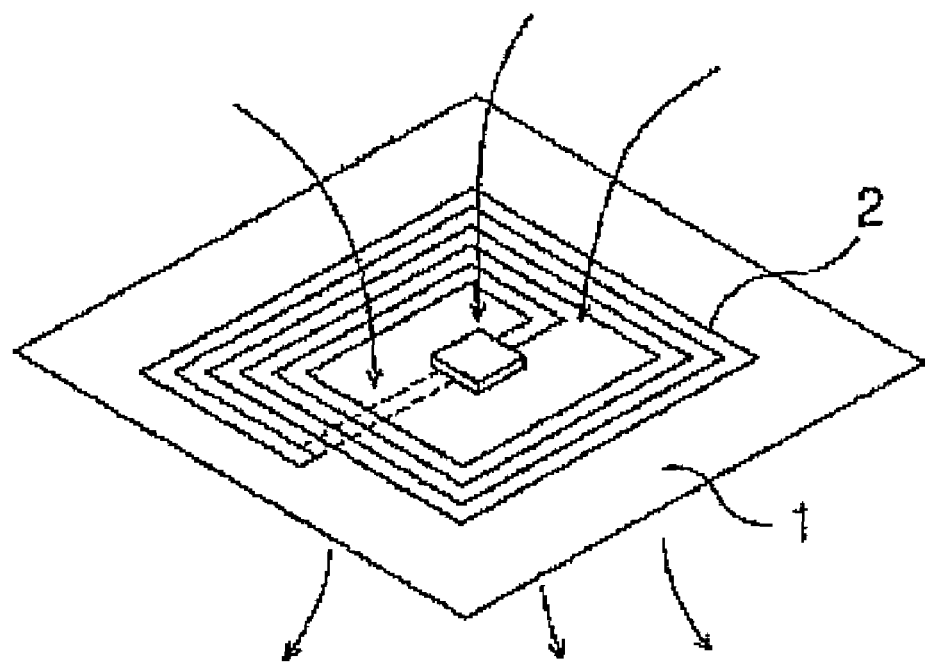
FIG. 14 is a perspective view showing conventional antenna coil incorporating a vortex member

FIG. 1 is a perspective view showing the RFID tag in accordance with this invention, FIG. 2 is a perspective view showing the RFID tag incorporating the cover in accordance with this invention, FIG. 3 is a cross-sectional view taken along the line A-A of FIG. 2, FIG. 4 is an exploded perspective view showing the RFID tag incorporating the cover in accordance with this invention, FIG. 5 is a cross-sectional view taken along the line B-B of FIG. 4, FIG. 6 is a perspective view showing the RFID tag affixed with the adhesive sheet in accordance with this invention, FIG. 7 is a cross-sectional view taken along the line C-C of FIG. 6, FIG. 8 is a perspective view showing the ceramic patch antenna in accordance with this invention, FIG. 9 is a cross-sectional view taken along the line D-D of FIG. 8, FIG. 10 is an exploded perspective view showing the cased ceramic patch antenna in accordance with this invention, FIG. 11 is a cross-sectional view taken along the line E-E of FIG. 10, FIG. 12 illustrates an exemplary embodiment of the antenna in accordance with this invention, FIG. 13 is a perspective view showing conventional antenna coil which has a conductor wound in spiral around a magnetic member, FIG. 14 is a perspective view showing conventional antenna coil incorporating a vortex member.

The RFID tag in accordance with this invention is characterized by comprising; a lower antenna member (30) of which one end is formed with coupling projection (31); an upper antenna member (30') of which one end is formed with coupling groove (32); RFID chip (20) of which one end is conjoined with the coupling projection (31) of the lower antenna (30), the other end is conjoined with the coupling groove (32) of the upper antenna (30'), containing the information of the objective matter and communicating with the relevant terminal device; and electrically insulating spacer (40) which is placed between the two antennas (30) (30'); and the RFID chip connected with the antennas is placed on the upside or downside of the spacer. The present invention is also characterized by; the antennas (30) (30') are combined in parallel on both sides of the spacer (40); the RFID chip (20) which is connected with the antennas (30) (30') is combined on the upside or underside of the spacer (40), transmitting signals through the antennas (30) (30') to send to the reader so that the reader can read the information from the RFID chip (20).

RFID chip (20) contains the information of the object and sends the information by communicating with terminal device (reader). The RFID chip (20) is comprised of a chip (21) containing the information of the object attached to the substrate (21). The substrate is formed in double bended shape.

Antennas (30) (30') are formed with thin plate in diverse shapes, minimizing thickness, and enable RFID chip (20) to transmit data signals to reader. Antennas (30) (30') may be shaped in diverse geometry, for example, a square.

The spacer (40) prevents the antennas (30) (30') from electrically contacting with the object and to insulate the two antennas (30) (30').

In addition, the antennas (30) (30') are characterized by being made of copper (Cu).

In addition, the antennas (30) (30') are characterized by being made of gold (Au).

In addition, the antennas (30) (30') are characterized by being made of silver (Ag).

The antennas (30) (30') are preferably made of copper, gold, or silver which have higher conductivity. Copper is easily available, easy to process, and cheap.

In addition, the spacer (40) is characterized by having thickness range of 0.1~10 mm.

In case that the spacer (40) is thick, the thickness of the RFID tag (10) also becomes thick. Thicker RFID chip (10) is liable to be separated from object during handling or by accident.

In addition, the spacer (40) is characterized by being made of sponge.

In addition, the spacer (40) is characterized by being made of ceramic material.

In addition, the spacer (40) is characterized by being made of Teflon.

Ceramics is a comprehensive name of sintered mineral, inorganic materials, which have excellent temperature resistance.

Sponge refers to porous materials made from natural rubber or synthetic resins. The representative polymer used to produce sponge is polyurethane, which is used in the form of flexible polyurethane foam. Common foam agent is carbon dioxide which is generated in the manufacturing process of polyurethane, however, other foam agents such as chlorofluorocarbon.

Viscose sponge made from viscose rayon or rubber sponge made from rubber and foam agent are also available.

Teflon (polytetrafluoroethylene; PTFE) is a crystalline synthetic resin which is resistant to heat (up to 260° C.) and chemicals, and high electric resistance, high frequency characteristics, non-adhesive, low friction coefficient, and inflammable. PTFE has melting point of 327° C., continuously usable in 260° C., and stable in very low temperature (−268° C.). Teflon has the highest resistance against chemicals of all the organic materials, not affected by acid, alkali, or other solvents, deteriorated only by special chemicals such as fluorine gas, molten alkali metals, or trifluorochloride, in severe conditions. Teflon as used in gaskets, packing, and various sealant materials.

In addition, the spacer (40) is characterized by having a chip mounting groove (41) which is provided to protect RFID chip (20) from shock, reducing error in data handling. The mounting groove (41) is formed according to the size of RFID chip (20) on the edge of the top or bottom side of the spacer (40) so that the RFID chip (20) can be locked and protected.

In addition, the exterior of the RFID tag (10) is characterized by additional electric insulating cover (50).

The cover (50) is made of humidity resistant, endurable, electric insulating material to prevent electric contact between the antennas (30) (30') and the object to which the tag will be affixed. In case that the antennas (30) (30') are made of aluminum or copper, electric insulation is required between the antenna and the conductive member. The cover (50) contains the RFID tag (10) which comprises spacer (40), RFID chip (20), and the antennas (30) (30') assembly.

In addition, this invention is also characterized by forming an adhesive layer (71) between the antenna (30) (30') and the spacer (40).

The adhesive layer (71) is formed of adhesive substance of which one side is combined with the antennas (30) (30') and the other side is combined with the spacer (40), as shown in the FIG. 6, enabling the combination of the antennas (30) (30') and the spacer (40). Or the adhesive layer (71) has adhesive surfaces of which one side is combined with the antennas (30) (30') and the other side is combined with the spacer (40) enabling the combination of the antennas (30) (30') and the spacer (40). And it is desirable that the adhesive layer (71) is not fixed to the RFID chip (20) but only with the antennas to protect the RFID chip (20) being damaged by the adhesive layer (71) of which the surface is coated with bonding agent.

In addition, the exterior side of the antennas (30) (30') is characterized by being coated with adhesive sheet (70). The adhesive sheet (70) is formed to protect the antennas (30) (30') from external shock. The adhesive sheet (70) is preferably formed with synthetic resin substance, and may be formed by, for an example, coating adhesive agent on the side of the antennas (30) (30').

In addition, the RFID tag (10) is characterized by being enclosed in a case (90) which is a hexahedron of which the top is open.

The case (90) is a hexahedron of which top is open, enclosing the RFID tag (10) inside. The RFID tag (10), as shown in FIG. 4, is designed to enclose the surface on which the RFID chip (20) is mounted in the enclosure case (90), so that the RFID chip (20) can be protected from external impact. This type of design has additional merit of easy assembly work, since the assembly of the RFID tag (10) is completed by simply mounting it in the case (90).

In order to enclose the RFID tag (10) in the case (90), the dimensions of the spacer (40) of the RFID tag (10) have to be fit with the inner dimensions of the case (90). In addition, by utilizing same material for the spacer (40) and the case (90), the spacer (40) and the case (90) are combined to construct a complete case. Therefore, the antennas (30) (30') and the RFID chip (20) are simply joined with the spacer (40) and enclosed in the case (90). By forming projection on the side of the spacer (40), the spacer can be interlocked with the case (90) for firm assembly.

In addition, the antennas (30) (30') are characterized by being formed with conductive ink spray on the adhesive sheet (70).

The antennas (30) (30') are formed by printing technique, using conductive ink. The conductive ink, which is produced with filler distributed in vehicle, has electrically conductive property when dried. Major and common ingredients of the conductive ink are metals (silver, gold, platinum, palladium, copper, or nickel), metal oxide (ruthenium oxide), nongraphitic carbon powder, graphite, or carbon fiber. The technologies in relation with such conductive ink are commonly known.

For information purpose, conductive ink is made with conductive filler dissolved in vehicle substance, of which dried coating film has electric conductivity when dried. Conductive ink can be classified into high temperature curing type (thick film paste) and low temperature drying type (resin), according to the curing condition. High temperature curing type conductive ink is used to form thick film for the surface mounting of hybrid IC, semiconductor IC, condensers, or electrodes. Low temperature curing type ink is also widely used, for their conductive and adhesive properties, in forming conductive printed circuit, and with the materials which are not suitable for soldering, such as low temperature materials such as plastics, carbon, ferrite, etc. On the other hand, conductive coating materials are being used for electromagnetic wave shield, which has been popularized according to the spread of electric or electronic appliances which emit intensive electromagnetic wave, including TV, radio, personal computer, video game device, etc. There are no clear criteria for the classification of the conductive ink and conductive coating material, however, conductive ink is mainly used in printing.

In addition, the antennas (30) (30') are characterized by being formed with conductive ink painted on the adhesive sheet (70).

To form the antennas on the adhesive sheet (70), place a mold which has antenna shape pattern and spray conductive ink. Diverse antenna shape can be formed with appropriate pattern mold.

In addition, the antennas (30) (30') are characterized by being formed by soaking one side of the adhesive sheet (70) in conductive ink.

To form the antennas by soaking the adhesive sheet (70) in conductive ink, one side of the adhesive sheet (70) is soaked in conductive ink and dried. The antennas (30) (30') formed by soaking the adhesive sheet (70) in conductive ink can be minimized in their thickness. The active signals can be transmitted through the antennas (30) (30') to the reader device so that the reader device can receive the information stored in the RFID chip (20). The antennas (30) (30') can be formed in diverse shapes in accordance with their specific use.

In addition, the present invention is characterized by comprising; a dielectric ceramic member (210) of which the permittivity range is 4.0~210 and a feeder hole (211) is punched at its center; conductive film formed on one side of the dielectric ceramic (210); an earth plate with a feeder hole (231) at its center and combined on the other side of the dielectric ceramic (210); a feeder pin (240) which is penetrating the feeder hole (211) of the dielectric ceramic (210) and feeding electricity to the conductive film (220) by electrical contact; and the feeder pin (240) is penetrating through the feeder hole (211) of the dielectric ceramic (210), the conductive film (220) is so configured to cover the feeder hole (211) of the dielectric ceramic (210) to have electrical contact with the feeder pin which is penetrating through the feeder hole of the dielectric ceramic (210), and the feeder hole (231) of the earth plate (230) is larger than the feeder hole (211) of the dielectric ceramic (210) so that electrically insulated from the feeder pin (240).

The dielectric ceramic (110) is made of ceramics which has permittivity range of 4.0~110, and a feeder hole (111) is formed by punching at its center The dielectric ceramic (110) is a dielectric of micro-strip substrate, which can be produced in diverse shapes such as triangle, rectangle, circle, square rectangle, or ring. In general, ceramic materials have the permittivity range of 4.0~110, which can be used to form the dielectric ceramic (110) used as the dielectric substrate.

For information purpose, permittivity (dielectric constant) is the proportional constant of the electric force between two electric charges. Therefore, permittivity differs according to the material (medium) placed in between the two electric charges. The permittivity value is defined by the ratio between the electrostatic capacities of two plates when there is no material between them and the material is placed between them. The permittivity of dielectric materials is always larger than 1. For example, the permittivity of atmosphere is 1.000335, however, which differs greatly according to the humidity, and influences the transmission of electromagnetic wave.

To examine the characteristics of the permittivity, the most important factor of permittivity influencing the electronic device design is the wavelength. With high permittivity value, the electromagnetic wave that progresses through the dielectric has the value which is divided by the root square of the Dielectric Constant, that is, the guided wavelength, therefore, it has critical influence on the dimensions of the electronic circuit element. Generally, one of the simplest techniques of reducing electronic circuit size is to use high permittivity value materials for the substrate or resonators. In addition to the size, mixture of various permittivity substances can be provided to make use of specific wavelength component according to the material, or desirable characteristics can be obtained by generating multi wavelength by manipulating permittivity. In general, using higher permittivity value materials reduces dimensions of substrate, and vice versa.

Generally, in addition to the variety and higher value, the permittivity of ceramics is most suitable for downsizing electronic elements due to the stability to temperature.

The conductive film (120) is formed on one side of the dielectric ceramic (110), which in general may have various shapes such as triangle, rectangle, circle, square rectangle, or ring. The conductive film (120) is so constructed as a portion can be cut off to regulate the radiating electric field. The conductive film (120) is generally made with conductive substances including gold, silver, or copper and forms the radiating surface of the antenna.

The earth place (130) is formed on the other side of the dielectric ceramic (110), with a feeder hole (131) at its center. The feeder hole (131) of the earth plate (130) is larger than the feeder hole (111) of the dielectric ceramic (110) so that it is electrically insulated from the feeder pin (140).

The feeder pin (140) is penetrating the feeder hole (111) of the dielectric ceramic (110) to contact electrically with the conductive film (120) and feed electricity, of which position can be adjusted to control impedance characteristics, and its location is on the earthed surface which minimizes the conjoin of the feeder point and the conductive film (120). The feeder pin (140) is formed in a diameter which corresponds to that of the feeder hole (111) of the dielectric ceramic (110).

The ceramic patch antenna in accordance with this invention for RFID system reader and tag is constituted of the conductive film (120) on one side of the dielectric ceramic (110) and the earth plate (130) formed on the other side. And the feeder pin (140) is penetrating the feeder hole (111) of the dielectric ceramic (110) to feed electricity to the conductive film (120). The conductive film (120) is so formed as to cover the feeder hole (111) of the dielectric ceramic (110) in order to be electrically contacted with the feeder pin (140) penetrating the feeder hole (111) of the dielectric ceramic (110). And diameter of the feeder hole (131) of the earth plate (130) is formed to be larger that the diameter of the feeder hole (111) of the dielectric ceramic (110), to be electrically insulated from the feeder pin (140).

This invention also applies to the tag antennas which are used to construct RFID tags, enabling the control of the metal objects to which the tags are affixed, without being influenced by the metal and without the degradation of the successful receiving ratio of the RFID tags.

In addition, the patch antenna has case members which are characterized by constituted with the top case member (310) on the conductive film (120), in the same shape, and the bottom case member (320) which has a punched feeder hole (322) at its center and conjoins with the earth plate (130).

The top case member (310) has same shape as that of the patch antenna (100) and is formed at the conductive film side (120), while the bottom case member (320) which has a feeder hole (322) at its center is formed at the earth plate (130) side.

The top case member and the bottom case member are made of synthetic resins, in order to prevent influencing the earth plate (130) of the patch antenna (100) and being influenced by the object material to which the RFID tag will be affixed. This also can enhance the durability of the patch antenna (100) in high temperature environments, for example, iron mills.

The coupling between the top case member (310) and the bottom case member (320) can be made by diverse methods, for example, thermal or bolt joint. In the exemplary embodiment shown in the drawings, the coupling is performed by forming coupling projection (311) on the top case member (310), coupling groove (321) on the bottom case member (320), and the coupling projection and groove are interlocked after enclosing the patch antenna (100) to complete the case enclosure.

In addition, the bottom case member (320) is characterized by being made of metal.

In addition, the bottom case member (320) can be made of metal. In case that the bottom case member is made of metal, as well as enhanced strength and durability, since it is combined at the earth plate side (130), not at the conductive film (120) side of the patch antenna (100), therefore, the data receiving rate of the antenna is not affected, rather, the receivable range can be extended by the interaction with the earth plate (130).

In addition, the patch antenna (100) is characterized by being comprised of multiple antenna components in symmetric layout centering at the chip (60), having the same distance between the chip (60) and the antenna components, improving directionality and efficiency by enhanced identification distance and bandwidth.

FIG. 12 shows a preferable embodiment in accordance with this invention. The figure shows that, the RFID) system antenna in accordance with this invention comprises multiple antenna members (210) (220) (230) (240) (210') (220') (230') (240') in connection with a chip (60) at center. The distance from the antenna (210) to its contact point (J1) is same as the distance from the antenna (220) to its contact point (J1). Also, the distance from the antenna (230) to its contact point (J2) is same as the distance from the antenna (240) to its contact point (J2).

And the distance from the contact point (J1) to contact point (J3) is same as the distance between the contact points (J2) and (J3). And the distances from the antenna members (210) (220) (230) (240) to the contact point (J3) are all the same. Consequently, the distances from the antenna members (210) (220) (230) (240) to the chip (60) are all the same. And the distance form the antenna (210') to its contact point (J1') is same as the distance from the antenna (220') to its contact point (J1'). Also, the distance from the antenna (230') to its contact point (J2') is same as the distance from the antenna (240') to its contact point (J2'). And the distance from the contact point (J1') to contact point (J3') is same as the distance between the contact points (J2') and (J3'). And the distances from the antenna members (210') (220') (230') (240') to the contact point (J3') are all the same. Consequently, the distances from the antenna members (210') (220') (230') (240') to the chip (60) are all the same. In this configuration, all the distances from the antenna members (210) (220) (230) (240) (210') (220') (230') (240') to the chip (60) are the same.

By connecting multiple antenna members to the RFID chip (60), the RFID system antennas in accordance with this invention can improve directionality and efficiency by enhanced identification distance and bandwidth. Both the angle and the distance of the identification are extended, therefore, the information in the RFID tags can be transmitted to reader more correctly and reliably. In addition, since the distances from the multiple antenna members to the chip are all the same, the information of the RFID tag is identified and transmitted to the chip (60) in the same time, which ensures the correctness of the information identification.

FIGS. 13 and 14 show conventional arts, wherein the conventional antenna coils used in RFID tags are mostly formed with sheathed conductor wire, wound spirally and affixed on base plate, or, as illustrated in FIG. 14, with aluminum or copper foil layered on base plate (1) of which unnecessary portion is removed by etching or punching to form rectangular spiral coil (2). However, in the antenna coil shown in FIG. 14, the magnetic flux is generated in the perpendicular direction to the base plate (1) as illustrated with arrowed lines in the figure. Therefore, in case that the antenna coil is affixed to a metal surface, the electromagnetic wave transmitted to the antenna penetrates the base plate (1) into the metal surface generating eddy current on the metal surface. Such eddy current affects the function of the coil, which may cause failure, or the available range becomes significantly shorter due to the eddy current loss. In order to solve this problem, an antenna coil type illustrated in the FIG. 13 is known. In FIG. 13, the antenna is formed with a magnetic member (6) and conductor (7) wound spirally around the magnetic member (6). In this type of antenna coil, since the magnetic flux is generated along the longitudinal axis of the magnetic member as illustrated with arrowed lines, it is expected that the electromagnetic wave radiated to the antenna coil does not penetrate into metal surface, enabling normal functionality of the antenna coil.

However, the antenna coil illustrated in the FIG. 13 is produced by winding conductor wire (7) around magnetic member (6); therefore, such winding process is relatively complicated, degrading productivity. In addition, conductor wire (7) wound around magnetic member (6) makes the coil thicker. Therefore, the RFID tags incorporating such antenna coils protrude from the surface of the object.

As is described hereinabove, the RFID tags in accordance with the present invention can be produced with very thin antenna, And the shape and the configuration of the antenna can easily be made in desirable patterns. Therefore, preferable thickness and shape of antenna can be achieved without degrading the data receiving rate of the RFID tags, while enabling manufacturing cost reduction and process simplification.

In addition, the antenna of RFID tag in accordance with this invention is formed with conductive ink painting, spraying, or printing. Therefore, diverse antenna shapes can be obtained in relatively simple process, antenna thickness can be very thin, and manufacturing cost can be reduced while maintaining the data receiving rate of the RFID tag.

In addition, since the ceramic patch antenna in accordance with this invention can be downsized by using ceramics of which permittivity value is 4.0~210, therefore, the dimensions of the dielectrics can be reduced which in turn reduces the dimensions of the antenna, enabling their use on moving or small objects, more efficiently and conveniently.

In addition, the RFID system antenna in accordance with this invention is comprised of multiple antenna members connected to a chip; therefore, directionality and efficiency of the antenna can be improved making the antenna suitable for RFID based systems.

This invention can provide RFID system antennas which function as a part of the long distance reading antenna system within the relevant laws and regulations related with electromagnetic field emission, provide appropriate identification capability for all available tag/antenna directions, provide longer read/write range than the antennas manufactured by conventional art, enable RFID systems to read information in the RFID tags in wider range and width, in simpler process and lower cost of manufacture.

What is claimed is:

1. A radio frequency identification (RFID) tag comprising:
a lower antenna having a coupling projection at one end;
an upper antenna having a coupling groove at one end;
a RFID chip containing information of an object which can be communicated with a reader device, one end being coupled with the projection of the lower antenna and the other end being coupled with the groove of the upper antenna; and
a spacer between the antennas to isolate the antennas electrically, the antennas being combined on both sides of the spacer in parallel, the RFID chip being connected with the antennas and fitted on a top side or a bottom side of the spacer so that active signals are transmitted through the antennas to send the information in the RFID chip to the reader device.

2. The RFID tag of claim 1, wherein the antennas are made of copper (Cu).

3. The RFID tag of claim 1, wherein the antennas are made of gold (Au).

4. The RFID tag of claim 1, wherein the antennas are made of silver (Ag).

5. The RFID tag of claim 1, wherein the spacer has a thickness of between approximately 0.1~10 mm.

6. The RFID tag of claim 5, wherein the spacer is made of a sponge material.

7. The RFID tag of claim 5, wherein the spacer is made of ceramics.

8. The RFID tag of claim 5, wherein the spacer is made of Teflon.

9. The RFID tag of claim 1, wherein the spacer is made of a sponge material.

10. The RFID tag of claim 1, wherein the spacer is made of ceramics.

11. The RFID tag of claim 1, wherein the spacer is made of Teflon.

12. The RFID tag of claim 1, wherein the spacer has a chip mounting groove.

13. The RFID tag of claim 1, wherein an exterior of the RFID tag has an additional insulation cover.

14. The RFID tag of claim 1, wherein an adhesive layer, having surfaces coated with an adhesive agent, is between the antennas and the spacer.

15. The RFID tag of claim 14, wherein exterior sides of the antennas are coated with an adhesive sheet.

16. The RFID tag of claim 15, wherein conductive ink is sprayed on the adhesive sheet.

17. The RFID tag of claim 15, wherein conductive ink is painted on the adhesive sheet.

18. The RFID tag of claim 15, wherein one side of the adhesive sheet is soaked in conductive ink.

19. The RFID tag of claim 14, wherein the RFID tag is enclosed in a hexahedron case with an open top side.

20. The RFID tag of claim 1, wherein exterior sides of the antennas are coated with an adhesive sheet.

21. The RFID tag of claim 20, wherein conductive ink is sprayed on the adhesive sheet.

22. The RFID tag of claim 20, wherein conductive ink is painted on the adhesive sheet.

23. The RFID tag of claim 20, wherein one side of the adhesive sheet is soaked in conductive ink.

24. The RFID tag of claim 1, wherein the RFID tag is enclosed in a hexahedron case with an open top side.

* * * * *